Jan. 15, 1924.
E. W. SUNDELL
STAR MAP
Filed Oct. 20, 1921
1,480,793
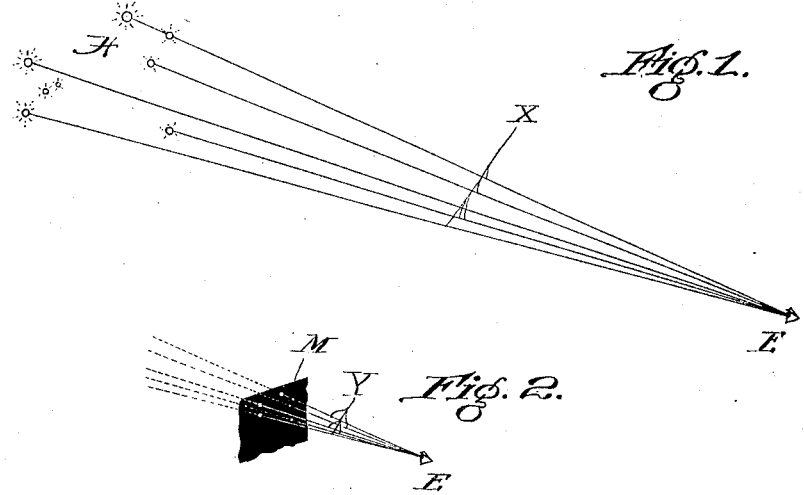
Fig. 1.
Fig. 2.
Fig. 3.
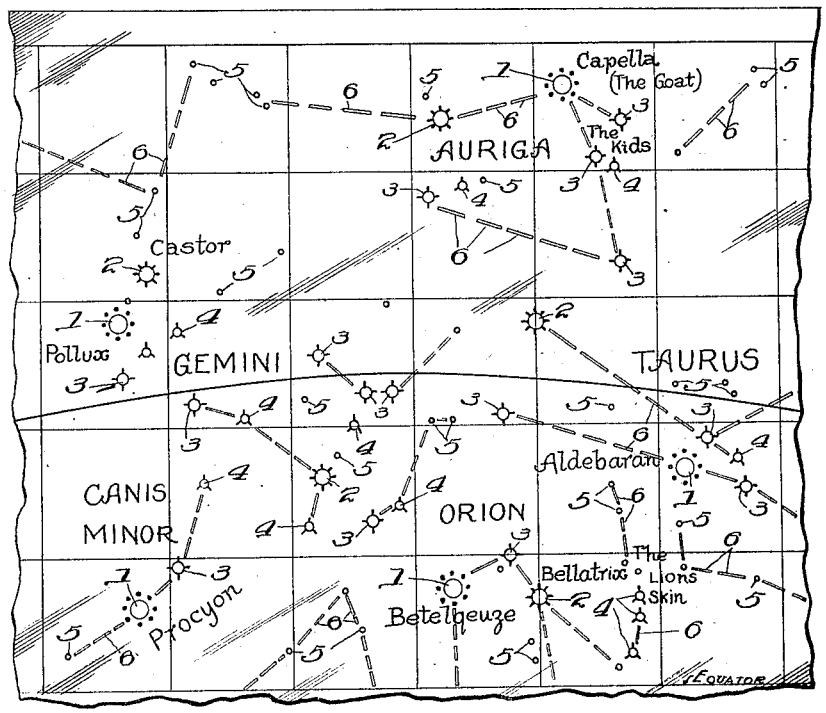
Inventor:
Ernest W. Sundell.
By
his Attorneys.
Witness:

Patented Jan. 15, 1924.

1,480,793

UNITED STATES PATENT OFFICE.

ERNEST W. SUNDELL, OF OAK PARK, ILLINOIS.

STAR MAP.

Application filed October 20, 1921. Serial No. 509,137.

*To all whom it may concern:*

Be it known that I, ERNEST W. SUNDELL, a citizen of the United States, residing in the village of Oak Park, in the county of Cook, in the State of Illinois, have invented certain new and useful Improvements in Star Maps, of which the following is a specification, reference being had to the accompanying drawings, forming a part thereof.

The purpose of this invention is to provide a star map in such form as to facilitate the study of the heavens at night by direct comparison of the map and the sky without the aid of a telescope and without the use of artificial light in referring to the map. It consists of certain features of construction as hereinafter described and shown in the drawings and as indicated by the claims.

In the drawings:—

Figure 1 is a diagrammatic perspective view representing the constellation of Auriga as viewed by the eye of the observer.

Figure 2 is a similar diagrammatic perspective view of the luminous representation of Auriga on a map embodying this invention and viewed by the eye of the observer at a normal reading distance from the map.

Figure 3 is a face view of a fragment of the map.

It may be understood that the complete star map of the heavens is made horizontally oblong to represent the entire series of constellations visible in all directions and it may also include a circular arrangement of the circumpolar stars; but for the purpose of illustrating this invention only a fragment of such a map need be shown as in Figures 2 and 3. The essential feature of the invention consists in representing the various stars on the map by small circular areas, 1, 2, 3, 4 and 5, which are rendered luminous. Preferably I secure this result by covering the map surface at these circular areas with luminous radiant material such as the radium composition frequently employed for clock dials to cause the dial markings to glow in the dark. I do not confine myself, however, to this specific means for securing luminosity of the areas representing the stars.

The reference numerals, 1, 2, 3, 4 and 5, are applied to the illustration of the map in Figure 3 to distinguish between the stars of the first, second, third, fourth and fifth magnitudes respectively. On the map the stars of the first four magnitudes are further distinguished by different peripheral markings which may or may not be self-luminous. In any event, I make the circular areas, 1, 2, 3, 4 and 5, different in size in approximate proportion to the difference of magnitude of the various stars which they represent, so that when viewed in the dark these respective markings will approximate the appearance of the stars in the sky, permitting a direct comparison between the map and the sky and greatly facilitating the identification of stars or constellations in the sky by reference to the map.

To further assist in the identification of the star groups or constellations, I prefer to add luminous connecting outlines, 6, which glow in the dark as do the circular star areas.

I find it most helpful to make the map on such a scale that when held in the hand of the observer at easy reading distance,—say from twelve to eighteen inches from the eye,—it shall display within the normal angle of vision a representation of the heavens corresponding substantially to the portion of the sky included in the normal vertical angle of vision. Figures 1 and 2 illustrate this feature; in Figure 1 the small circles grouped at A represent the stars in the sky composing the constellation Auriga and the eye of the observer is represented at E with a "pencil" of lines, X, converging from the various stars to the eye. Comparing this view with Figure 2 in which a fragment of the map is shown at M with luminous spots thereon representing the constellation Auriga, it will be seen that the pencil of lines, Y, proceeding from these spots to the eye, E, of the observer bear substantially the same angular relation to each other as the lines, X, in Figure 1. That is to say,—the representation of Auriga on the map subtends the same angle as the constellation itself. A map on this scale showing stars both north and south of the equator will be approximately ten inches in height and when used outdoors on a clear dark night, it presents to the eye, by virtue of the luminosity of the markings, an image of the heavens substantially the same in size as that which is seen when the actual stars themselves are viewed. In other words, the image resulting from the map is a duplicate of that produced by the sky itself, rendering the location of stars and constellations exceedingly simple for the observer by direct comparison of the map and the sky.

I claim:—

1. A star map on which the stars are represented by spots of radiant luminous material rendering them readily distinguishable in the dark.

2. A star map in accordance with claim 1 on which the respective stars are represented by spots of luminous material of different sizes corresponding approximately to the differences in magnitude of the stars represented.

3. A star map comprising luminous representations of the stars readily distinguishable in the dark, together with luminous connecting outlines indicating the various constellations.

4. A star map on which the stars are represented by luminous areas rendering them readily distinguishable in the dark, said map being made on such a scale that when held in the hand of the reader, it shall display within the normal angle of vision a representation of the heavens corresponding substantially to the area of the sky which is included in the normal vertical angle of vision.

In testimony whereof, I have hereunto set my hand at Chicago, Illinois, this 5th day of October, 1921.

ERNEST W. SUNDELL.